(12) United States Patent
Ahn

(10) Patent No.: US 10,060,297 B2
(45) Date of Patent: Aug. 28, 2018

(54) APPARATUS AND METHOD FOR REACTOR POWER CONTROL OF STEAM TURBINE POWER GENERATION SYSTEM

(71) Applicant: Doosan Heavy Industries & Construction Co., Ltd., Changwon-Si, Gyeongsangnam-Do (KR)

(72) Inventor: Jun Ho Ahn, Changwon-si (KR)

(73) Assignee: Doosan Heavy Industries & Construction Co., Ltd., Gyeongsangnam-do (KR)

( * ) Notice: Subject to any disclaimer, the term of this patent is extended or adjusted under 35 U.S.C. 154(b) by 650 days.

(21) Appl. No.: 14/523,132

(22) Filed: Oct. 24, 2014

(65) Prior Publication Data

US 2015/0218970 A1    Aug. 6, 2015

(30) Foreign Application Priority Data

Jan. 9, 2014    (KR) .......................... 10-2014-0003025

(51) Int. Cl.
   *F01K 13/02*    (2006.01)
   *F01K 7/22*    (2006.01)
   (Continued)

(52) U.S. Cl.
   CPC ................ *F01K 13/02* (2013.01); *F01K 7/22* (2013.01); *F01K 7/223* (2013.01); *F01K 7/24* (2013.01);
   (Continued)

(58) Field of Classification Search
   CPC .......... F01K 13/02; F01K 15/00; F01K 7/223; F01K 7/40; F01K 7/24; F01K 7/22;
   (Continued)

(56) References Cited

U.S. PATENT DOCUMENTS

| | | | | | |
|---|---|---|---|---|---|
| 3,244,898 | A | * | 4/1966 | Hickox | ................... F01K 13/02 122/448.1 |
| 3,766,732 | A | * | 10/1973 | Woodcock | .............. F22G 1/005 60/664 |

(Continued)

FOREIGN PATENT DOCUMENTS

| | | | |
|---|---|---|---|
| JP | S62-237012 A | 10/1987 |
| JP | 3780884 B2 | 5/2006 |

(Continued)

OTHER PUBLICATIONS

Korean Office Action issued in corresponding Korean Application No. 10-2014-0003025.

*Primary Examiner* — Hoang Nguyen
(74) *Attorney, Agent, or Firm* — Harness, Dickey & Pierce, P.L.C.

(57) ABSTRACT

Disclosed herein is an apparatus for reactor power control of a steam turbine power generation system including a reactor, a high-pressure turbine to which steam is supplied from the reactor through a main steam pipe, a low-pressure turbine to which the steam discharged from the high-pressure turbine is supplied via a moisture separator reheater, a branch pipe branched from the main steam pipe to be connected to the moisture separator reheater, a generator connected to the low-pressure turbine, a condenser for condensing the steam discharged from the low-pressure turbine, a condensate pump for feeding condensate condensed by the condenser, and feed water heaters for heating the condensate, the apparatus including a branch pipe control valve provided on the branch pipe and a control unit for controlling an opening degree of the branch pipe control valve.

20 Claims, 4 Drawing Sheets

(51) Int. Cl.
*F01K 7/40* (2006.01)
*F01K 7/24* (2006.01)
*F22B 1/02* (2006.01)
*F22G 1/00* (2006.01)
*F01K 15/00* (2006.01)
*H02K 7/18* (2006.01)
*H02P 9/04* (2006.01)
*G21D 3/00* (2006.01)

(52) U.S. Cl.
CPC ............... *F01K 7/40* (2013.01); *F01K 15/00* (2013.01); *F22B 1/023* (2013.01); *F22G 1/005* (2013.01); *H02K 7/1823* (2013.01); *H02P 9/04* (2013.01); *G21D 3/00* (2013.01)

(58) Field of Classification Search
CPC ......... H02K 7/1823; H02P 9/04; F22G 1/005; G21D 3/00; F22B 1/023
USPC ................ 60/644.1, 653, 677–680, 646, 657
See application file for complete search history.

(56) References Cited

U.S. PATENT DOCUMENTS

| | | | | |
|---|---|---|---|---|
| 3,935,710 | A * | 2/1976 | Dickinson | F01D 11/04 277/408 |
| 4,584,837 | A * | 4/1986 | Sakka | B01D 5/00 60/646 |
| 4,651,532 | A * | 3/1987 | Abe | F01K 7/24 60/646 |
| 6,742,336 | B2* | 6/2004 | Itou | F01K 7/223 60/644.1 |
| 2012/0272649 | A1* | 11/2012 | Berndt | F01K 7/22 60/645 |

FOREIGN PATENT DOCUMENTS

| | | |
|---|---|---|
| JP | 2010-270637 A | 12/2010 |
| JP | 2011-185165 A | 9/2011 |
| JP | 2013-053531 A | 3/2013 |
| KR | 10-0253437 B1 | 4/2000 |

* cited by examiner

APPARATUS AND METHOD FOR REACTOR POWER CONTROL OF STEAM TURBINE POWER GENERATION SYSTEM

CROSS-REFERENCE(S) TO RELATED APPLICATIONS

This application claims priority to Korean Patent Application No. 10-2014-0003025, filed on Jan. 9, 2014, the disclosure of which is incorporated herein by reference in its entirety.

BACKGROUND OF THE INVENTION

Field of the Invention

Exemplary embodiments of the present invention relate to an apparatus and method for reactor power control of a steam turbine power generation system, and more particularly, to an apparatus and method for reactor power control of a steam turbine power generation system, capable of following a power change request by regulating and controlling a flow rate of steam introduced into a turbine.

Description of the Related Art

Power generation systems using a steam turbine are used for a thermal power plant or a nuclear power plant.

Among them, a nuclear power generation system will be illustratively described in more detail with reference to FIG. 1. The nuclear power generation system may include a reactor 7, turbines 17 and 19, a condenser 21, and feed water heaters 22 and 24.

The reactor 7 includes a core in which a plurality of fuel rods and a control rod for controlling reactivity of the core are arranged, and generates steam supplied to the turbines 17 and 18 to be described later. The control rod adjusts power of the reactor, namely core power.

Steam generated by the reactor 7 is supplied to a main steam pipe 14 connected to the reactor 7. The steam supplied to the main steam pipe 14 is supplied to a high-pressure turbine 17 via a main steam pipe control valve 16 provided on the main steam pipe 14. The main steam pipe control valve 16 regulates an amount of the steam supplied to the high-pressure turbine 17.

The seam supplied to the high-pressure turbine 17 is supplied to a low-pressure turbine 19 via a moisture separator reheater 18. The low-pressure turbine 19 is connected to a generator 20.

The condenser 21 for condensing the steam discharged from the low-pressure turbine 19 is installed at an outlet of the low-pressure turbine 19. A low-pressure feed water heater 22, a feed water pump 23, and a high-pressure feed water heater 24 are installed downstream from the condenser 21. A feed water pipe 15 is connected to an outlet of the high-pressure feed water heater 24.

The feed water pipe 15 joined from the condenser 21 to the reactor 7 is provided downstream from the condenser 21. The low-pressure feed water heater 22 for heating feed water supplied from the condenser 21 and the high-pressure feed water 24 for pressurizing feed water to supply the pressurized feed water to the reactor are sequentially disposed on the feed water pipe 15.

In the nuclear power generation system described above, steam generated by the reactor is supplied to the high-pressure and low-pressure turbines through the main steam pipe and the turbines are rotated by the steam to rotate the generator connected thereto.

The steam discharged from the low-pressure turbine is condensed through the condenser, and condensed condensate is heated by the multiple feed water heaters installed on the feed water pipe so as to be supplied back to the reactor through the feed water pipe.

Meanwhile, consumption of electric power greatly varies according to seasons, weekdays and weekends, day and night, etc. An electric power system allows an amount of power generation and power consumption to be balanced so that a voltage and a power system frequency are stably maintained.

Power adjustment of the electric power system as a whole is mainly performed on thermal power generation or hydraulic power generation. However, power control is also needed on nuclear power generation as the percentage of nuclear power generation is increased recently.

Conventionally, it is apprehended that gaseous radioactive fission products (xenon, iodine, etc) leak into reactor cooling water when a fuel cladding conduit is cracked by a thermal change according to a power change. Therefore, the nuclear power generation system operates at uniform power.

However, in recent years, in the nuclear power generation system, measures such as an improvement of the cladding conduit are taken to resolve the above apprehension, and electric power companies, manufacture companies, and research institutes perform research, test, and the like on power adjustment operation. In addition, the nuclear power generation system is designed such that power may be changed, that is, power may be adjusted by operation thereof.

When consumption of electric power exceeds production in the electric power system, the speed of a generator is decreased and a power system frequency is lowered. When the production exceeds the consumption, the speed of the generator is increased and the power system frequency is raised. The power control of the power generation system for corresponding to such a change is generally performed by a method of regulating an amount of steam generated by the reactor (or a boiler) or regulating an amount of main steam supplied to the turbine.

However, the amount of steam generated by the reactor is regulated by control of a flow rate of the core and position adjustment of the control rod, and the amount of steam generated by the boiler is also regulated by regulating an amount of feed water, an amount of fuel, and an amount of air. Accordingly, a time constant is large until the power of the generator is changed. Therefore, there is a problem in that follow-up performance corresponding to a power change is deteriorated.

The method of regulating the amount of main steam supplied to the turbine through the main steam pipe control valve may merely reduce the power of the generator by reducing an amount of steam supplied to the high-pressure turbine. Accordingly, there is a problem in that, when power of the generator is reduced, the method may not properly correspond to a request for compensation of the reduced power.

SUMMARY OF THE INVENTION

The present invention has been made in view of the above problems, and it is an object of the present invention to provide an apparatus and method for reactor power control of a steam turbine power generation system, capable of improving follow-up performance to a power change when compensation for a power reduction of a generator is requested.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an apparatus for reactor power control of a steam turbine power generation system including a reactor, a high-pressure turbine to which steam is supplied from the reactor through a main steam pipe, a low-pressure turbine to which the steam discharged from the high-pressure turbine is supplied via a moisture separator reheater, a branch pipe branched from the main steam pipe to be connected to the moisture separator reheater, a generator connected to the low-pressure turbine, a condenser for condensing the steam discharged from the low-pressure turbine, a condensate pump for feeding condensate condensed by the condenser, and feed water heaters for heating the condensate, the apparatus includes a branch pipe control valve provided on the branch pipe and a control unit for controlling an opening degree of the branch pipe control valve.

In the apparatus, the control unit may control the opening degree of the branch pipe control valve according to a power compensation request signal corresponding to a power reduction of the generator.

In the apparatus, the control unit may control the branch pipe control valve such that the branch pipe control valve becomes any one of a fully open state, a partially closed state, and a fully closed state.

The apparatus may further include a condensate pipe control valve provided on a condensate pipe connected between the condenser and the condensate pump, an opening degree of the condensate pipe control valve being controlled by the control unit.

The apparatus may further include an extraction pipe control valve provided on a first extraction pipe connected between a low-pressure feed water heater of the feed water heaters and the low-pressure turbine or provided on a second extraction pipe connected between a high-pressure feed water heater of the feed water heaters and the high-pressure turbine, an opening degree of the extraction pipe control valve being controlled by the control unit.

In accordance with another aspect of the present invention, a method for reactor power control of a steam turbine power generation system including a reactor, a high-pressure turbine to which steam is supplied from the reactor through a main steam pipe, a low-pressure turbine to which the steam discharged from the high-pressure turbine is supplied via a moisture separator reheater, a branch pipe branched from the main steam pipe to be connected to the moisture separator reheater, a generator connected to the low-pressure turbine, a condenser for condensing the steam discharged from the low-pressure turbine, a condensate pump for feeding condensate condensed by the condenser, and feed water heaters for heating the condensate, the method includes (a) measuring power of the generator, (b) determining whether or not the power is reduced by comparing a measured power value of the generator with a target power value, (c) generating a power compensation request signal corresponding to the power reduction of the generator, and (d) regulating an amount of steam supplied through the branch pipe according to the power compensation request signal.

In the method, the (d) regulating an amount of steam may be controlling an opening degree of a branch pipe control valve provided on the branch pipe.

In the method, the branch pipe control valve may be controlled to become any one of a fully open state, a partially closed state, and a fully closed state.

The method may further include, after the (d) regulating an amount of steam, (e) determining whether or not power compensation is performed by measuring the power of the generator, and (f) controlling the branch pipe control valve such that the branch pipe control valve becomes a state before the (d) regulating an amount of steam according to the determination of the power compensation.

The method may further include, after the (c) generating a power compensation request signal, (d') regulating an amount of condensate introduced into the condensate pump according to the power compensation request signal.

In the method, the (d') regulating an amount of condensate may be simultaneously performed together with the (d) regulating an amount of steam.

The method may further include, after the (c) generating a power compensation request signal, (d") regulating an amount of extraction steam supplied from the high-pressure turbine or the low-pressure turbine to the feed water heaters according to the power compensation request signal.

In the method, the (d") regulating an amount of extraction steam may be simultaneously performed together with the (d) regulating an amount of steam.

In accordance with a further aspect of the present invention, an apparatus for reactor power control of a steam turbine power generation system including a turbine supplied with steam to rotate a generator, a condenser for condensing the steam discharged from the turbine, a condensate pump for feeding condensate condensed by the condenser, and a feed water heater for heating the condensate, the apparatus include a condensate pipe control valve provided on a condensate pipe connected between the condenser and the condensate pump, an extraction pipe control valve provided on an extraction pipe connected from the turbine to the feed water heater, and a control unit for controlling opening degrees of the condensate pipe control valve and the extraction pipe control valve.

In the apparatus, the control unit may control opening degrees of a condensate pipe control valve and an extraction pipe control valve according to a power compensation request signal corresponding to a power reduction of the generator.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

An apparatus and method for reactor power control of a steam turbine power generation system according to exemplary embodiments of the present invention will be described below in more detail with reference to the accompanying drawings. In the description, the drawings are not necessarily to scale and in some instances, proportions may have been exaggerated in order to clearly illustrate features of the embodiments.

In addition, terms to be described later are terms defined in consideration of functions of the present invention, and these may vary with the intention or practice of a user or an operator. Therefore, such terms should be defined based on the entire content disclosed herein.

Furthermore, the following embodiments are for the purpose of describing the components set forth in the appended claims only and are not intended to limit the spirit and scope of the invention. More particularly, various variations and modifications are possible in concrete constituent elements of the embodiments, and it is to be understood that differences relevant to the variations and modifications fall within the spirit and scope of the present disclosure defined in the appended claims.

Figure 1:
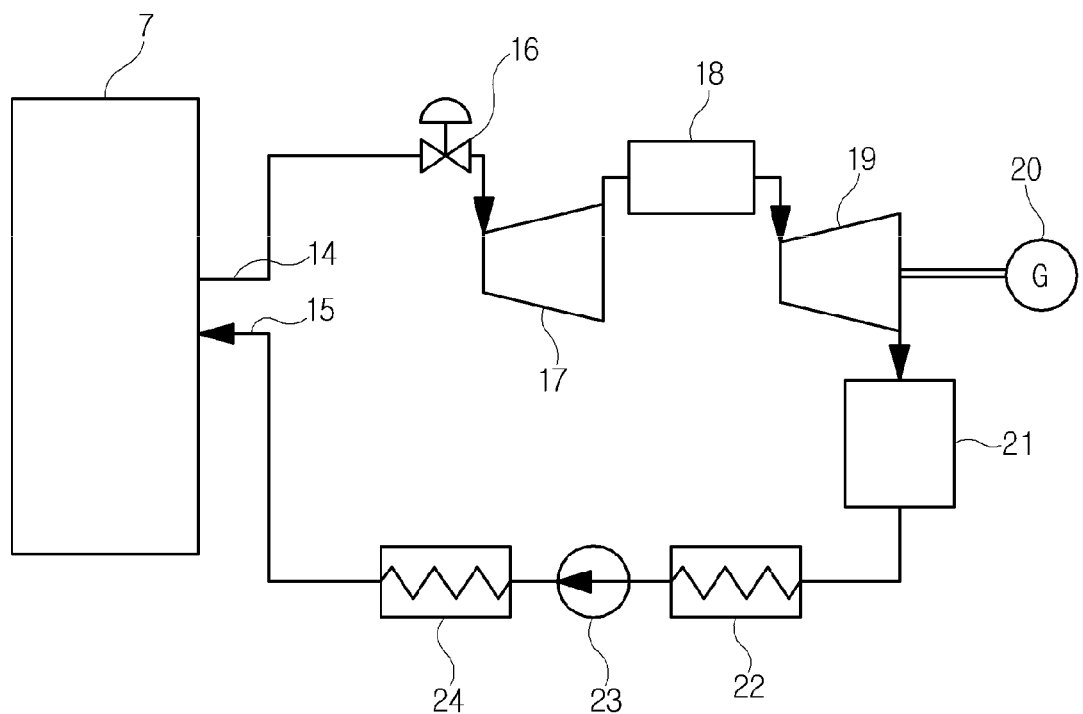
FIG. 1 is a diagram schematically illustrating an illustrative configuration of a nuclear power generation system.
Figure 2:
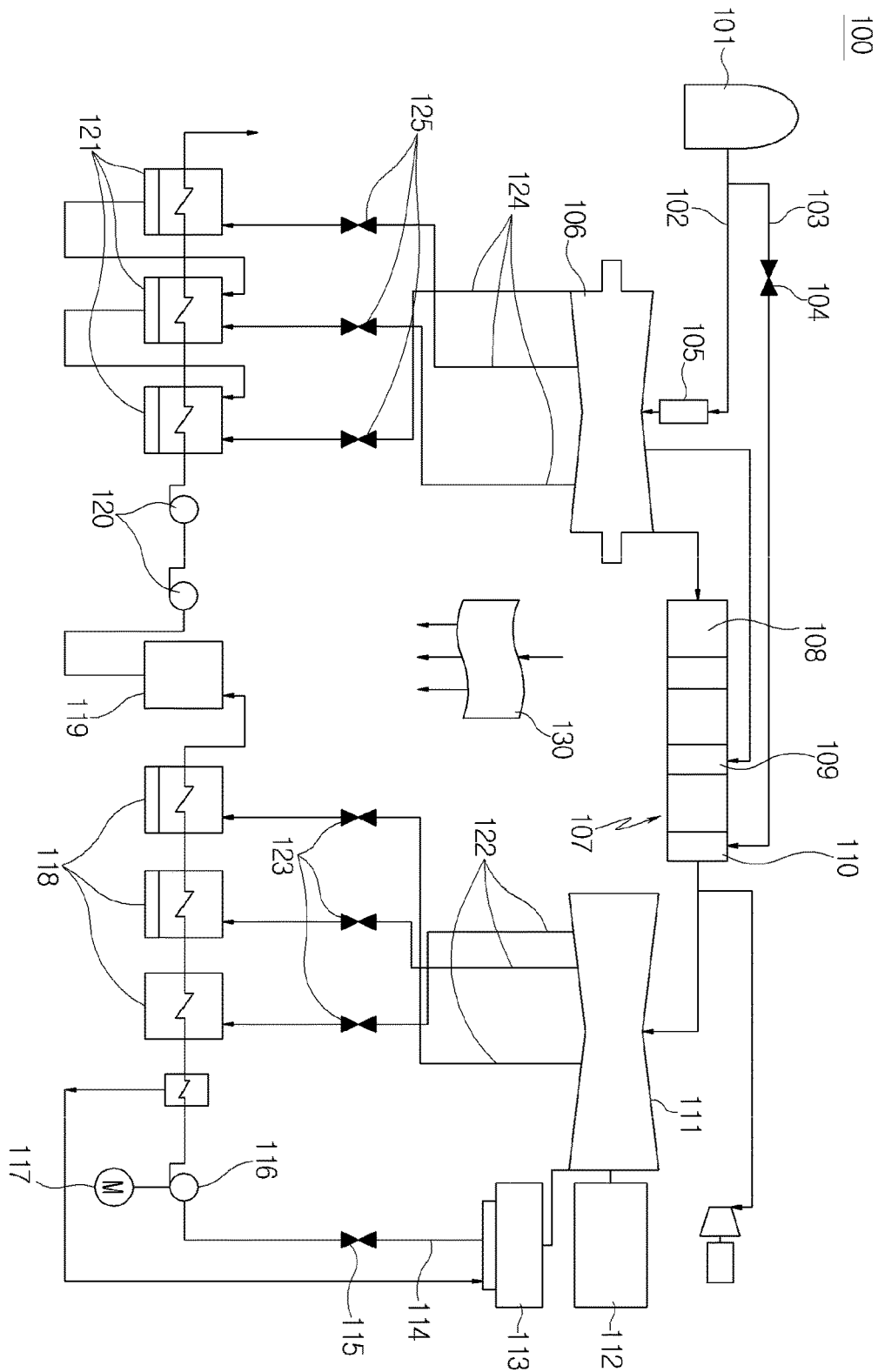
FIG. 2 is a diagram schematically illustrating a configuration of a steam turbine power generation system including an apparatus for reactor power control according to an embodiment of the present invention.

Hereinafter, an apparatus for reactor power control of a steam turbine power generation system according to an embodiment of the present invention will be described in detail with reference to FIG. 2. FIG. 2 is a diagram schematically illustrating a configuration of a steam turbine power generation system including an apparatus for reactor power control according to an embodiment of the present invention.

First, an illustrative power generation system to which the apparatus for reactor power control according to the embodiment of the present invention is applicable may be a nuclear power generation system 100 as shown in FIG. 2.

As shown in the drawing, the nuclear power generation system 100 may include a reactor 101, a high-pressure turbine 106, a low-pressure turbine 111, a moisture separator reheater 107, a generator 112, a condenser 113, a condensate pump 116, and feed water heaters 118 and 121.

The reactor 101 is configured to generate steam, and the steam generated by the reactor 101 may be supplied to the high-pressure turbine 106 through a main steam pipe 102. A main steam pipe control valve 105 is installed at an inlet of the high-pressure turbine 106 on the main steam pipe 102 so that an amount of steam supplied to the high-pressure turbine 106 may be regulated by controlling an opening degree of the main steam pipe control valve 105.

The steam discharged from the high-pressure turbine 106 is supplied to the low-pressure turbine 111 via the moisture separator reheater 107 to be described later.

The steam supplied to the high-pressure turbine 106 and the low-pressure turbine 111 allows rotational energy to be generated by the turbine, and the rotational energy is converted into electrical energy by rotation of the generator 112 connected to the low-pressure turbine 111.

The moisture separator reheater (MSR) 107, which separates moisture from the steam discharged from the high-pressure turbine 106 and heats the steam having a lowered temperature so as to recover energy efficiency, is disposed between the high-pressure turbine 106 and the low-pressure turbine 111.

The moisture separator reheater 107 may include a moisture separator 108 for separating moisture, and a heater for heating steam from which the moisture is separated. In this case, the heater may include a first heater 109 and a second heater 110, for sequentially heating steam.

For example, heated steam in the first heater 109 may be extraction steam supplied from the high-pressure turbine 106 and heated steam in the second heater 110 may be branch steam branched from the main steam pipe 102.

The main steam pipe 102 may be formed with a branch pipe 103 such that the heated steam may be supplied to the second heater 110. The branch pipe 103 is branched from the main steam pipe 102 to be connected to the second heater 110. A portion of the steam supplied through the main steam pipe 102 is supplied to the second heater 110 through the branch pipe 103 so as to be used as heated steam.

A process of separating moisture and heating steam using the moisture separator and reheater 107 will be described.

The steam at the inlet of the high-pressure turbine 106 is in a moisture steam state. The steam supplied to the high-pressure turbine 106 actuates the turbine so that heat energy of the steam is converted into rotational energy of the turbine.

Thus, the temperature of the steam is lowered and the humidity of the steam becomes higher at the inlet of the high-pressure turbine 106. When the humidity becomes higher, loss of the turbine is increased compared to dry steam and turbine blades may be corroded due to moisture.

In order to resolve these problems, moisture contained in the steam discharged from the high-pressure turbine 106 is separated by the moisture separator 108. Exhaust steam in the high-pressure turbine 106 has a low humidity by moisture separation.

The steam from which moisture is separated by the moisture separator 108 is heated by the above extraction steam and branch steam in the first and second heater 109 and 110 to be converted into a dry steam state. The dry steam from which moisture is removed is supplied to the low-pressure turbine 111.

The steam rotating the low-pressure turbine 111 is condensed through heat exchange by the condenser 113 and becomes condensate. The condensate condensed by the condenser 113 is stored in a condenser hot well and then supplied to the feed water heaters while being fed by the condensate pump 116 driven by a motor 117.

The feed water heaters may be configured of a low-pressure feed water heater 118 and a high-pressure feed water heater 121.

The low-pressure feed water heater 118 is supplied with the condensate by the condensate pump 116. The condensate supplied to the low-pressure feed water heater 118 by the condensate pump 116 is heated by low-pressure extraction steam, as a heat source, extracted from the low-pressure turbine 111.

A first extraction pipe 122 may be connected between the low-pressure turbine 111 and the low-pressure feed water heater 118 such that the low-pressure extraction steam is supplied to the low-pressure feed water heater 118 through the first extraction pipe 122. Feed water heated by the low-pressure feed water heater 118 is stored in a feed water tank 119.

The feed water stored in the feed water tank 119 is supplied to the high-pressure feed water heater 121 in a state in which the pressure of the feed water is increased by a feed water pump 120. The condensate supplied to the high-pressure feed water heater 121 is heated by high-pressure extraction steam, as a heat source, extracted from the high-pressure turbine 106. A second extraction pipe 124 may be connected between the high-pressure turbine 106 and the high-pressure feed water heater 121 such that the high-pressure extraction steam is supplied to the high-pressure feed water heater 121 through the second extraction pipe 124.

The feed water heated by the high-pressure feed water heater 121 may be supplied to the reactor 101.

Meanwhile, the apparatus for reactor power control of a steam turbine power generation system according to the embodiment of the present invention may include a branch pipe control valve 104 provided on the branch pipe 103 and a control unit 130 for controlling an opening degree of the branch pipe control valve 104.

As described above, the branch pipe 103 is a pipe which is branched from the main steam pipe 102 to be connected to the second heater 110 so that branch steam is supplied to the second heater 110 through the branch pipe 103. The branch pipe control valve 104 may regulate an amount of branch steam supplied through the branch pipe 103 while the opening degree thereof is adjusted by the control unit 130.

Power information of the generator 112 is transmitted to the control unit 130 under rated power operation. In this case, for example, when power of the turbine is reduced, the control unit 130 obtaining power information of the generator 112 according to the same may generate power compensation request signals to compensate for the reduced power.

The power compensation request signals may be divided and generated according to the extent of power compensation values determined by the control unit 130. The power compensation request signals may include signals for determining valve positions of the above-mentioned branch pipe control valve 104. In this case, the determined valve positions may be divided and determined according to the extent of the power compensation values described above.

The opening degree of the branch pipe control valve 104 is controlled according to the power compensation request signals output from the control unit 130. The branch pipe control valve 104 is controlled according to the valve positions determined by the control unit 130 such that the branch pipe control valve 104 is from a fully open state to a fully closed state, from a fully open state to a partially closed state, or from a partially closed state to a fully closed state.

However, although the branch pipe control valve 104 may include the control of the partially closed state as described above, it may also be simply controlled to be any one of the fully open state and the fully closed state.

As such, the branch pipe control valve 104 is controlled to be partially closed or fully closed, and thus an amount of branch steam supplied to the second heater 110 may be partially decreased or fully blocked.

As the amount of steam branched from the main steam pipe 102 is decreased or blocked, the amount of steam supplied to the high-pressure turbine 106 is relatively increased. As a result, the power of the generator 112 may be increased. That is, this is to compensate for the reduced power of the generator.

In accordance with the apparatus for reactor power control according to the embodiment, even though control for increasing or decreasing an amount of steam generated by the reactor 101 is not performed, it may be possible to compensate for the power of the generator 112 through control of the amount of steam supplied to the high-pressure turbine 106 by controlling the amount of branch steam. Accordingly, it may be possible to significantly improve follow-up performance corresponding to the power change.

The apparatus for reactor power control according to the embodiment may further include a condensate pipe control valve 115. The condensate pipe control valve 115 may be provided on a condensate pipe 114 connected between the condenser 113 and the condensate pump 116. An opening degree of the condensate pipe control valve 115 may be controlled according to the above-mentioned power compensation request signals from the control unit 130.

When compensation for the power reduction of the generator 112 is requested, the control unit 130 determines valve positions of the condensate pipe control valve 115 so that the condensate pipe control valve 115 is controlled to be from a fully closed state to a partially closed state, from a fully closed state to a fully closed state, or from a partially closed state to a fully closed state.

An amount of condensate introduced into the condensate pump 116 may be partially decreased or fully blocked according to control of the opening degree of the condensate pipe control valve 115 by the control unit 130.

Such control may allow an amount of steam discharged from the low-pressure turbine 111 to be decreased, and thus the power of the turbine may be increased.

In addition, since an amount of condensate fed by the condensate pump may be decreased, it may be possible to reduce power required in the condensate pump 116. Thus, as the required power is reduced, it may be possible to decrease the speed of the motor 117 for driving the condensate pump 116 compared to during normal operation and thus to reduce power consumption. Since the reduction of the power consumption is compensated with power of the generator 112, the power of the generator 112 is consequentially increased.

The apparatus for reactor power control according to the embodiment may further include extraction pipe control valves 123 and 125.

The extraction pipe control valves 123 and 125 may be provided on the above-mentioned first extraction pipe 122 or second extraction pipe 124. An opening degree of each of the extraction pipe control valves 123 and 125 may be controlled according to the above-mentioned power compensation request signals from the control unit 130.

An amount of extraction steam supplied to the low-pressure feed water heater 118 or the high-pressure feed water heater 121 may be partially decreased or fully blocked according to control of the opening degree of the extraction pipe control valve 123 or 125. As a result, the amount of steam used for turbine actuation in the high-pressure turbine 106 or the low-pressure turbine 111 is increased, and thus the power of the generator 112 may be increased.

Meanwhile, an amount of feed water stored in the above-mentioned feed water tank 119 and an amount of condensate stored in the condenser hot well may be measured by a measuring means and be transmitted to the control unit 130. The control unit 130 analyzes the measured amount of feed water and amount of condensate, and then may control any one opening degree of the branch pipe control valve 104, the condensate pipe control valve 115, and the extraction pipe control valves 123 and 125, simultaneously control two or more opening degrees of them, or interlock and control two or more opening degrees of them at intervals of time.

Although the above turbines have been described to be configured of the high-pressure turbine 106 and the low-pressure turbine 111, the present invention is not limited thereto. The present invention may further include an intermediate-pressure turbine disposed between the high-pressure turbine 106 and the low-pressure turbine 111.

Figure 3:
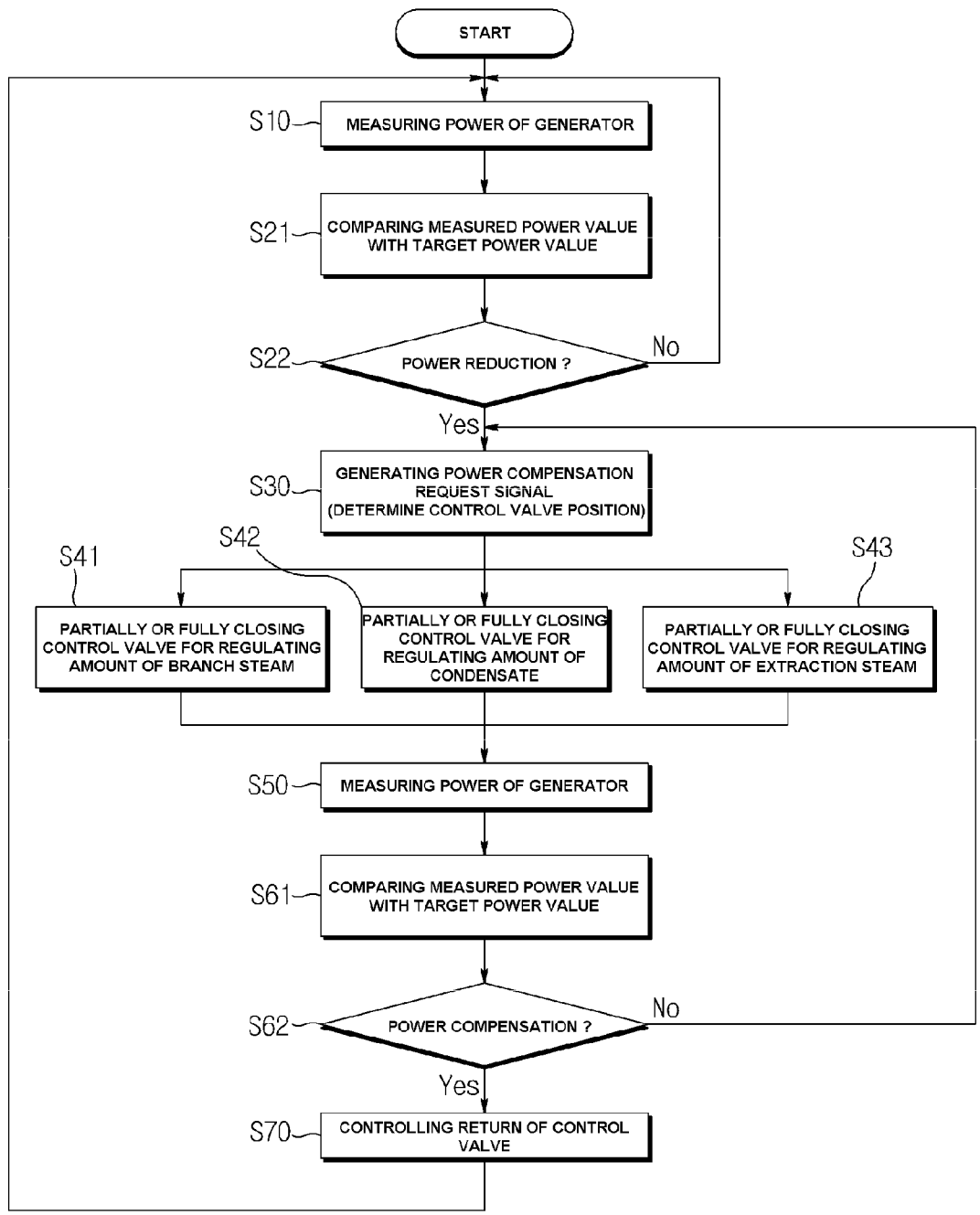
FIG. 3 is a flowchart illustrating a method for reactor power control of a steam turbine power generation system according to an embodiment of the present invention.

Hereinafter, a method for reactor power control of a steam turbine power generation system according to an embodiment of the present invention will be described in detail with reference to FIGS. 2 and 3. FIG. 3 is a flowchart illustrating a method for reactor power control of a steam turbine power generation system according to an embodiment of the present invention.

First, the method for reactor power control of a steam turbine power generation system according to the embodiment may perform a step S10 of measuring power of the generator 112. The power of the generator 112 may be consistently measured and measured power information may be transmitted to the control unit 130.

Next, the control unit 103 may perform a step S21 of comparing a measured power value of the generator 112 with a target power value and a step S22 of determining whether or not the power is reduced according to the comparison result. This is the purpose of performing control of a power change corresponding to the power reduction when the power reduction when the power reduction of the generator 112 is identified.

Next, the control unit 130 may perform a step S30 of generating power compensation request signals corresponding to the power reduction of the generator 112 when the power reduction of the generator 112 is identified. The power compensation request signals are control signals for increasing an amount of steam supplied to the high-pressure turbine 106. For example, when a branch steam control valve is provided on the branch pipe 103 as described above, the power compensation request signals may include signals for determining valve positions of the branch steam control valve.

Next, the control unit 130 may perform a step S41 of outputting the generated signals to regulate an amount of branch steam supplied through the branch pipe 103. In more detail, the control unit 130 may perform a step of decreasing an amount of branch steam supplied to the second heater 110 and simultaneously increasing an amount of steam supplied to the high-pressure turbine 106 by controlling the opening degree of the branch steam control valve.

In this case, the branch pipe control valve 104 may be controlled to be from a fully open state to a partially closed state, from a partially closed state to a fully closed state, or from a fully open state to a fully closed state.

In addition, the control unit 130 may also perform a step S42 of outputting the above-mentioned power compensation request signals to regulate an amount of condensate introduced into the condensate pump 116. In this case, the power compensation request signals may include signals for determining the valve positions of the condensate pipe control valve 115 provided on the condensate pipe 114. The control unit 130 may partially decrease or fully block the amount of condensate introduced into the condensate pump 116 by controlling the opening degree of the condensate pipe control valve 115.

In addition, the control unit 130 may also perform a step S43 of outputting the above-mentioned power compensation request signals to regulate an amount of high-pressure extraction steam supplied from the high-pressure turbine 106 to the high-pressure feed water heater 121 or an amount of low-pressure extraction steam supplied from the low-pressure turbine 111 to the low-pressure feed water heater 118.

In this case, the power compensation request signals may include signals for determining the valve positions of the extraction pipe control valve 123 provided on the first extraction pipe 122 or the extraction pipe control valve 125 provided on the second extraction pipe 124. The control unit 130 may partially decrease or fully block the amount of extraction steam supplied to the high-pressure feed water heater 121 or the low-pressure feed water heater 118 by controlling the opening degree of the extraction pipe control valve 123 or 125.

Meanwhile, any one of the above-mentioned step S41 of regulating an amount of branch steam, step S42 of regulating an amount of condensate, and step S43 of regulating an amount of extraction steam performed by the control unit 130 may also be performed according to the power compensation request signals output from the control unit 130. Also, two or more steps of them may also be simultaneously performed or interlocked and performed at intervals of time. However, in the latter case, it is preferable that two or more steps are simultaneously performed in order to improve follow-up performance to the power change.

The method for reactor power control according to the embodiment may further include a step S50 of measuring power of the generator 112 after the step S41 of regulating an amount of branch steam, step S42 of regulating an amount of condensate, and step S43 of regulating an amount of extraction steam are performed.

In this case, the control unit 130 may perform a step S62 of comparing a measured power value of the generator 112 with a target power value to determine whether or not power compensation is performed.

When it is identified that the power is still reduced, that is, the power compensation is requested, the step S30 of generating power compensation request signals and the subsequent control steps may be performed again.

When it is identified that the power compensation is performed, the control unit 130 may perform a step S70 of controlling the amount of branch steam, amount of condensate, and amount of extraction steam such that they is returned to a state before the power compensation request signals are output. That is, the control unit 130 may output control signals such that the opening degrees of the branch pipe control valve 104, condensate pipe control valve 115, and extraction pipe control valves 123 and 125 are returned to a state before the power compensation request signals are output. Subsequently, the power information of the generator 112 may be continuously transmitted to the control unit 130. When the power of the generator 112 is reduced, the above-mentioned series of control steps may be performed again.

The above-mentioned apparatus for reactor power control of a steam turbine power generation system according to the embodiment of the present invention has been illustratively described to be applied to the nuclear power generation system 100. However, the follow-up control performed through the control of the opening degree of the above-mentioned condensate pipe control valve 115 or extraction pipe control valve 123 or 125 when the power of the generator is changed may also be applied to a thermal power generation system as well as the nuclear power generation system 100.

Figure 4:
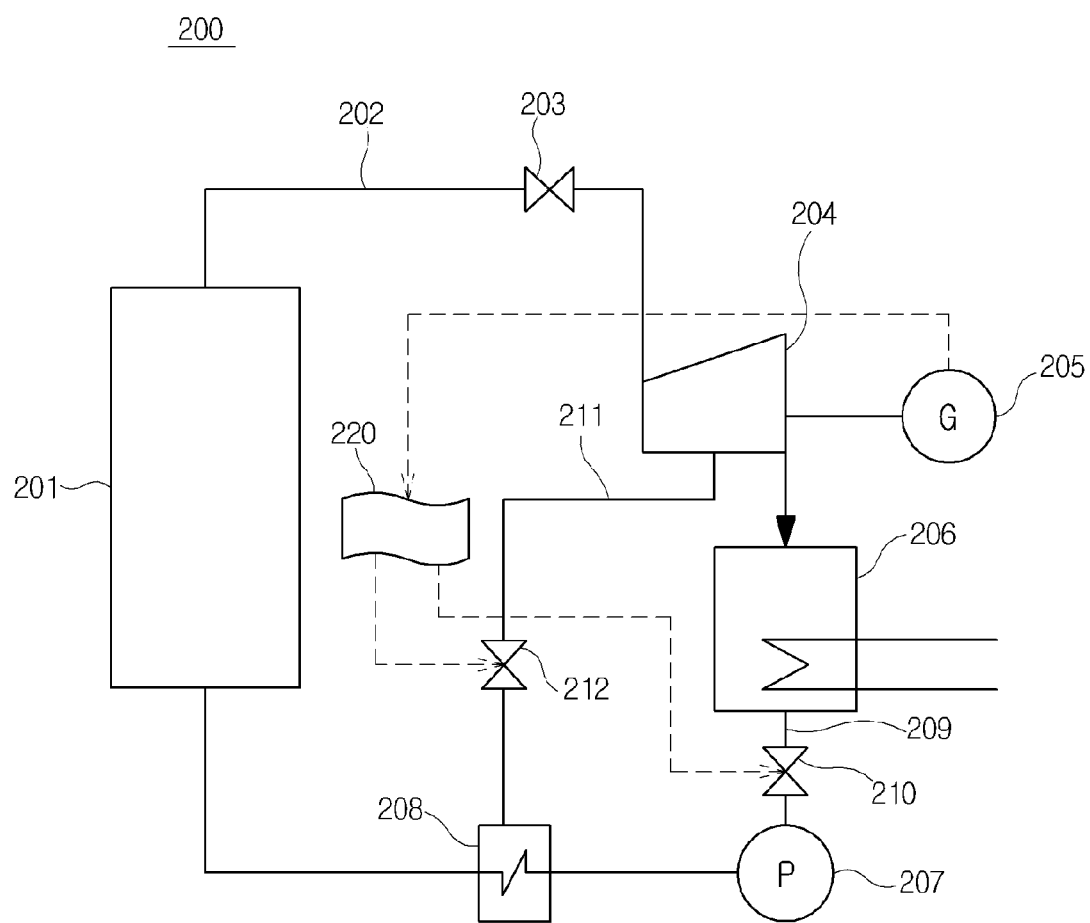
FIG. 4 is a diagram schematically illustrating a configuration of a steam turbine power generation system including an apparatus for reactor power control according to another embodiment of the present invention.

Hereinafter, an apparatus for reactor power control of a steam turbine power generation system capable of being applied to a thermal power generation system according to another embodiment of the present invention will be described in detail with reference to FIG. 4. However, the duplicated description of the same configurations will be simply described or omitted below. FIG. 4 is a diagram schematically illustrating a configuration of a steam turbine power generation system including an apparatus for reactor power control according to another embodiment of the present invention.

As shown in the drawing, a thermal power generation system 200 to which the apparatus for reactor power control according to the embodiment is applicable may include a turbine 204 supplied with steam to rotate a generator 205, a condenser 206 for condensing the steam discharged from the turbine 204, a condensate pump 207 for feeding condensate condensed by the condenser 206, and a feed water heater 208 for heating the condensate.

The turbine 204 may be supplied with the steam from a boiler 201 through a main steam pipe 202, and the main steam pipe 202 may be provided with a main steam pipe control valve 203 for regulating an amount of steam supplied to the turbine 204.

Heat energy of the steam supplied to the turbine 204 is converted into rotational energy while rotating the turbine 204, and the generator 205 connected to the turbine 204 is rotated by the rotational energy.

The steam discharged from the turbine 204 is condensed by the condenser 206, and condensed condensate is supplied to the feed water heater 208 by the condensate pump 207 through a condensate pipe 209. Extraction steam is supplied from the turbine 204 to the feed water heater 208 through an extraction pipe 211 connected between the feed water heater 208 and the turbine 204. The condensate supplied to the feed water heater 208 is heated by the extraction steam as a heat source.

Feed water heated by the feed water heater 208 may be supplied back to the boiler 201.

The shown thermal power generation system 200 differs from the nuclear power generation system in that a moisture separator reheater and a branch pipe through which branch steam is supplied to the moisture separator reheater are not formed in the thermal power generation system 200.

Although the turbine 204 is configured of one turbine as shown in the drawing, the present invention is not limited thereto. For example, the turbine may also be configured of a high-pressure turbine and a low-pressure turbine, or of a high-pressure turbine, an intermediate-pressure turbine, and a low-pressure turbine.

Similarly to the apparatus for reactor power control according to the previous embodiment, the apparatus for reactor power control according to the present embodiment may include a condensate pipe control valve 210 provided on the condensate pipe 209 and an extraction pipe control valve 212 provided on the extraction pipe 211.

Opening degrees of the condensate pipe control valve 210 and the extraction pipe control valve 212 are controlled by a control unit 220 included in the present embodiment.

When it is identified that power of the generator is reduced through measured power information of the generator, the control unit 220 may generate power compensation request signals when power compensation is required. The signals may include signals for determining valve positions of the above-mentioned condensate pipe control valve 210 or the extraction pipe control valve 212.

The opening degrees of the condensate pipe control valve 210 and the extraction pipe control valve 212 are controlled according to the power compensation request signals output from the control unit 220. By such control, it may be possible to increase an amount of steam used for actuation of the turbine 204 or reduce power required in the condensate pump 207. Consequently, it may be possible to compensate for the power of the generator.

As is apparent from the above description, according to the present invention, in order to compensate for power when a power reduction of a generator is identified, control for increasing an amount of steam introduced into a turbine, control for decreasing an amount of steam discharged from the turbine, or control for reducing power required in a condensate pump is performed, instead of control of an amount of steam in a reactor or a boiler having a great time constant. Such control may be realized by controlling a control valve for a short time. Accordingly, follow-up performance corresponding to a power change is significantly improved and thus efficiency of a power generation system may be significantly increased.

While the present invention has been described with respect to the specific embodiments, it will be apparent to those skilled in the art that various changes and modifications may be made without departing from the spirit and scope of the invention as defined in the following claims. Thus, it is intended that the present invention covers the modifications and variations of this invention provided they come within the scope of the appended claims and their equivalents.

What is claimed is:

1. An apparatus for reactor power control of a steam turbine power generation system including a reactor, a high-pressure turbine to which steam is supplied from the reactor through a main steam pipe, a low-pressure turbine to which the steam discharged from the high-pressure turbine is directly supplied via a moisture separator reheater, a branch pipe branched from the main steam pipe to be connected to the moisture separator reheater, a generator connected to the low-pressure turbine, a condenser configured to condense the steam discharged from the low-pressure turbine, a condensate pump configured to feed condensate condensed by the condenser, and feed water heaters configured to heat the condensate, the apparatus comprising:
a branch pipe control valve provided on the branch pipe; and
a controller configured to control an opening degree of the branch pipe control valve;
wherein the low-pressure turbine is a single turbine.

2. The apparatus according to claim 1, wherein the controller is configured to control the opening degree of the branch pipe control valve according to a power compensation request signal corresponding to a power reduction of the generator.

3. The apparatus according to claim 1, wherein the controller is configured to control the branch pipe control valve such that the branch pipe control valve becomes any one of a fully open state, a partially closed state, and a fully closed state.

4. The apparatus according to claim 1, further comprising a condensate pipe control valve provided on a condensate pipe connected between the condenser and the condensate pump, an opening degree of the condensate pipe control valve being controlled by the controller.

5. The apparatus according to claim 1, further comprising an extraction pipe control valve provided on a first extraction pipe connected between a low-pressure feed water heater of the feed water heaters and the low-pressure turbine or provided on a second extraction pipe connected between a high-pressure feed water heater of the feed water heaters and the high-pressure turbine, an opening degree of the extraction pipe control valve being controlled by the controller.

6. The apparatus according to claim 1, wherein the moisture separator reheater comprises a moisture separator configured to separate moisture, and first and second heaters configured to heat steam from which the moisture is separated.

7. The apparatus according to claim 6, wherein the branch pipe is connected the second heater such that branch steam is supplied to the second heater through the branch pipe.

8. A method for reactor power control of a steam turbine power generation system including a reactor, a high-pressure turbine to which steam is supplied from the reactor through a main steam pipe, a low-pressure turbine to which the steam discharged from the high-pressure turbine is directly supplied via a moisture separator reheater, a branch pipe branched from the main steam pipe to be connected to the moisture separator reheater, a generator connected to the low-pressure turbine, a condenser for condensing the steam discharged from the low-pressure turbine, a condensate pump for feeding condensate condensed by the condenser, and feed water heaters for heating the condensate, the method comprising:
 (a) measuring power of the generator;
 (b) determining whether or not the power is reduced by comparing a measured power value of the generator with a target power value;
 (c) generating a power compensation request signal corresponding to the power reduction of the generator; and
 (d) regulating an amount of steam supplied through the branch pipe according to the power compensation request signal;
 wherein the low-pressure turbine is a single turbine.

9. The method according to claim 8, wherein the (d) regulating an amount of steam is controlling an opening degree of a branch pipe control valve provided on the branch pipe.

10. The method according to claim 9, wherein the branch pipe control valve is controlled to become any one of a fully open state, a partially closed state, and a fully closed state.

11. The method according to claim 9, further comprising:
 after the (d) regulating an amount of steam,
 (e) determining whether or not power compensation is performed by measuring the power of the generator; and
 (f) controlling the branch pipe control valve such that the branch pipe control valve becomes a state before the (d) regulating an amount of steam according to the determination of the power compensation.

12. The method according to claim 8, further comprising, after the (c) generating a power compensation request signal, (d) regulating an amount of condensate introduced into the condensate pump according to the power compensation request signal.

13. The method according to claim 12, wherein the (d') regulating an amount of condensate is simultaneously performed together with the (d) regulating an amount of steam.

14. The method according to claim 8, further comprising, after the (c) generating a power compensation request signal, (d") regulating an amount of extraction steam supplied from the high-pressure turbine or the low-pressure turbine to the feed water heaters according to the power compensation request signal.

15. The method according to claim 14, wherein the (d") regulating an amount of extraction steam is simultaneously performed together with the (d) regulating an amount of steam.

16. A steam turbine power generation system comprising:
 a reactor;
 a high-pressure turbine to which steam is supplied from the reactor through a main steam pipe;
 a low-pressure turbine to which the steam discharged from the high-pressure turbine is directly supplied via a moisture separator reheater;
 a branch pipe branched from the main steam pipe to be connected to the moisture separator reheater;
 a generator connected to the low-pressure turbine;
 a condenser configured to condense the steam discharged from the low-pressure turbine;
 a condensate pump configured to feed condensate condensed by the condenser;
 feed water heaters configured to heat the condensate; and
 a controller configured to control a branch pipe control valve provided on the branch pipe and an opening degree of the branch pipe control valve;
 wherein the low-pressure turbine is a single turbine.

17. The steam turbine power generation system according to claim 16, wherein the controller is configured to control opening degrees of a condensate pipe control valve and an extraction pipe control valve according to a power compensation request signal corresponding to a power reduction of the generator.

18. The steam turbine power generation system according to claim 16, further comprising a condensate pipe control valve provided on a condensate pipe connected between the condenser and the condensate pump, an opening degree of the condensate pipe control valve being controlled by the controller.

19. The steam turbine power generation system according to claim 16, further comprising an extraction pipe control valve provided on a first extraction pipe connected between a low-pressure feed water heater of the feed water heaters and the low-pressure turbine or provided on a second extraction pipe connected between a high-pressure feed water heater of the feed water heaters and the high-pressure turbine, an opening degree of the extraction pipe control valve being controlled by the controller.

20. The steam turbine power generation system according to claim 16, wherein the moisture separator reheater comprises a moisture separator configured to separate moisture and first and second heaters configured to heat steam from which the moisture is separated, and the branch pipe is connected the second heater such that branch steam is supplied to the second heater through the branch pipe.

\* \* \* \* \*